United States Patent Office 3,461,151
Patented Aug. 12, 1969

3,461,151
URETHANE CONTAINING ISOCYANATES
Günter Oertel, Cologne-Flittard, and Hans Holtschmidt, Leverkusen-Steinbuchel, Germany, assignors to Farbenfabriken Bayer Aktiengesellschaft, Leverkusen, Germany, a corporation of Germany
No Drawing. Filed Nov. 22, 1965, Ser. No. 509,159
Claims priority, application Germany, Nov. 21, 1964, F 44,495
Int. Cl. C07c *119/04*
U.S. Cl. 260—471    11 Claims

ABSTRACT OF THE DISCLOSURE

Isocyanate compounds containing at least one N-disubstituted urethane group are prepared by reacting a primary amine containing at least one N-disubstituted group with phosgene.

---

This invention relates to a novel type of isocyanate and more particularly to new isocyanates containing urethane groupings.

In the preparation of isocyanates containing urethane groupings heretofore, an excess of the appropriate polyisocyanate monomer was simply reacted with a glycol or any other desired organic compound containing reactive hydrogen atoms as determined by the Zerewitinoff method to prepare a prepolymer having terminal NCO groups. The classic difficulty with this operation is the toxicity of the isocyanate monomer used and the impossibility of removing it completely from the urethane-containing isocyanate prepared without some extensive purification techniques which often resulted in the degradation of the polymer formed and entailed great expense in the bargain.

Even so, however, it is not possible to prepare N-disubstituted urethane-containing isocyanates by this method without further reactions since the nitrogen of the urethane grouping will always have a hydrogen atom attached to it in any reaction between an isocyanate and an active hydrogen containing compound.

It is therefore an object of this invention to provide a process for the preparation of isocyanates containing N-disubstituted urethane groupings which is devoid of the foregoing disadvantages.

It is a further object of this invention to provide a method for the production of isocyanates containing N-disubstituted urethane groups which is complete at the phosgenation stage.

A further object of this invention is to provide a unique type of isocyanate which contains N-disubstituted urethane groups.

The foregoing objects and others which will become apparent from the following description are accomplished in accordance with this invention, generally speaking, by reacting any primary mono or polyamine which contains at least one N-disubstituted urethane group in the molecule with phosgene to prepare isocyanates containing N-disubstituted urethane groups in a process which is complete at the phosgenation step.

Monomeric polyisocyanates containing one or more N-disubstituted urethane groups have previously been unknown, and are only available for the first time by the process of this invention. Unexpectedly, these isocyanates can be formed directly from amines containing one or more N-disubstituted urethane groups in the molecule by the action of phosgene. That this is such a surprising result can be graphically illustrated when one considers that in the reaction between an aliphatic or aromatic carbonamide and phosgene, carbon dioxide is given off, and the carbonamide grouping is converted substantially quantitatively into an amido chloride, as illustrated by the following reactions:

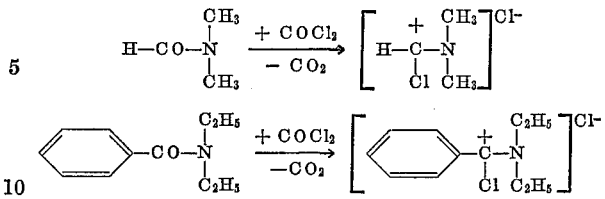

Further, in the reaction between an N-tetrasubstituted urea and phosgene, carbon dioxide is split off and a carbonamide is formed, as illustrated in the following reaction:

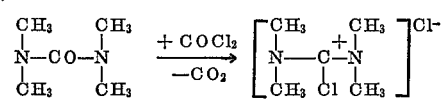

It is therefore apparent that the substituted ureas and carbonamides contain a common grouping which splits and gives off carbon dioxide under the influence of phosgene. The group that is common to these compounds is the

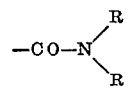

grouping wherein R represents any hydrocarbon radical, and since phosgene decomposes this grouping, to yield a

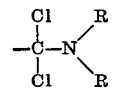

grouping, a similar result would be expected in any compound which contains the

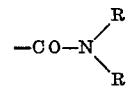

group when it is subjected to phosgene.

There is one instance, however, in which the carbonamide group does not decompose in the presence of phosgene, as shown in U.S. Patent 3,080,368. The patent shows that in a reaction between a carbonamide containing a primary amino group ortho to the carbonamide group and phosgene, a quaternization takes place between the carbonamide nitrogen and the NCO group being formed. When the carbonamide group is part of a urethan grouping, however, the presence of the additional oxygen atom prevents quaternization from taking place between the carbonamide group and the NCO group being formed. As a consequence, a primary amine containing at least one N-disubstituted urethane group should undergo at least a partial decomposition in the presence of phosgene to yield a mixture of by-products and salts with the evolution of a corresponding quantity of carbon dioxide since such compounds also contain a

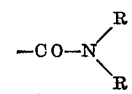

grouping as a constituent of the urethane group. Notwithstanding, a compound containing one or more primary amino groups and one or more N-disubstituted urethane groups does not even undergo a partial decomposition, but forms an isocyanate by the action of phosgene on the primary amino group or groups. The carbonamide group remains intact, and new monomeric mono or polyisocyanates containing N-disubstituted urethane groups can thus be prepared in excellent yields.

Suitable starting materials for the process of this invention are any primary mono or polyamines which contain at least one N-disubstituted urethane group in the molecule. Thus, the only limitations on the amine from which the isocyanate is to be prepared are that they contain at least one N-disubstituted urethane group and at least one primary amino group, the choice of the latter constituent depending upon whether a mono or polyisocyanate is desired. Further, other substituents which are inert to phosgene such as thioether-, ether-, nitrile-, sulfonic-, sulfonic acid ester- or carboxylic acid ester groups as well as halogen atoms such as chlorine and bromine or mixtures thereof may also be present in the molecule. The amines may be aliphatic, aromatic or mixed aliphatic and aromatic compounds and may contain straight or branched chains in the molecule in either case.

Primary amines containing at least one N-disubstituted urethane group may be prepared by the catalytic hydrogenation of compounds containing, in addition to the substituted urethane groups, nitro, cyano or carbonyl groups, or any other group which will yield a primary amino group on reduction. Some suitable primary amines containing N-disubstituted urethane groups which can be phosgenated in accordance with this invention to yield the novel isocyanate described herein are, for example:

$(CH_3)_2N-COO-CH_2CH_2-NH_2$    $(CH_3)_2N-COO-(CH_2)_4-NH_2$

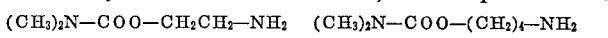
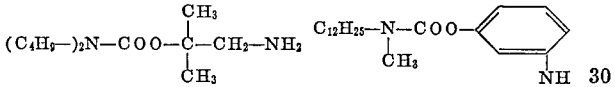
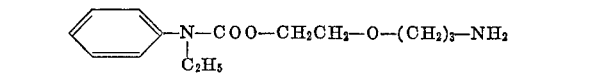
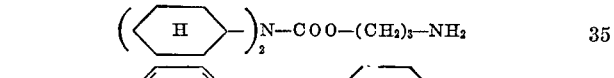
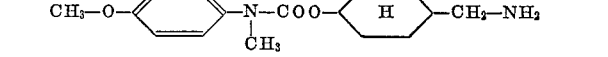
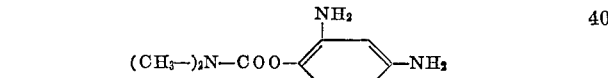
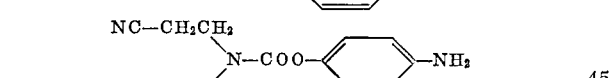
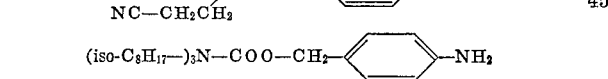
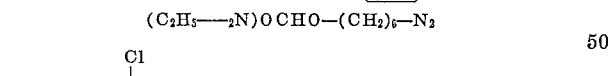
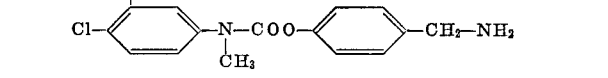
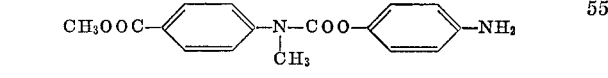
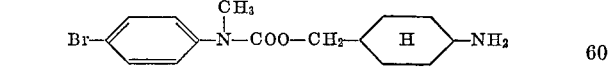
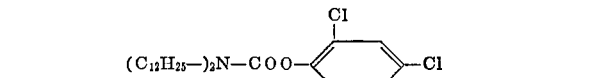
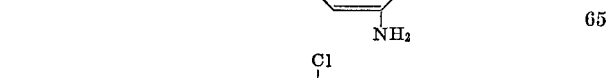
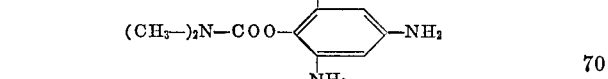
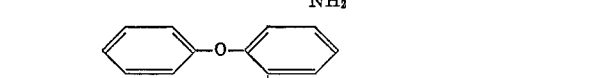
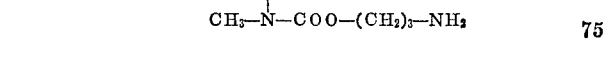
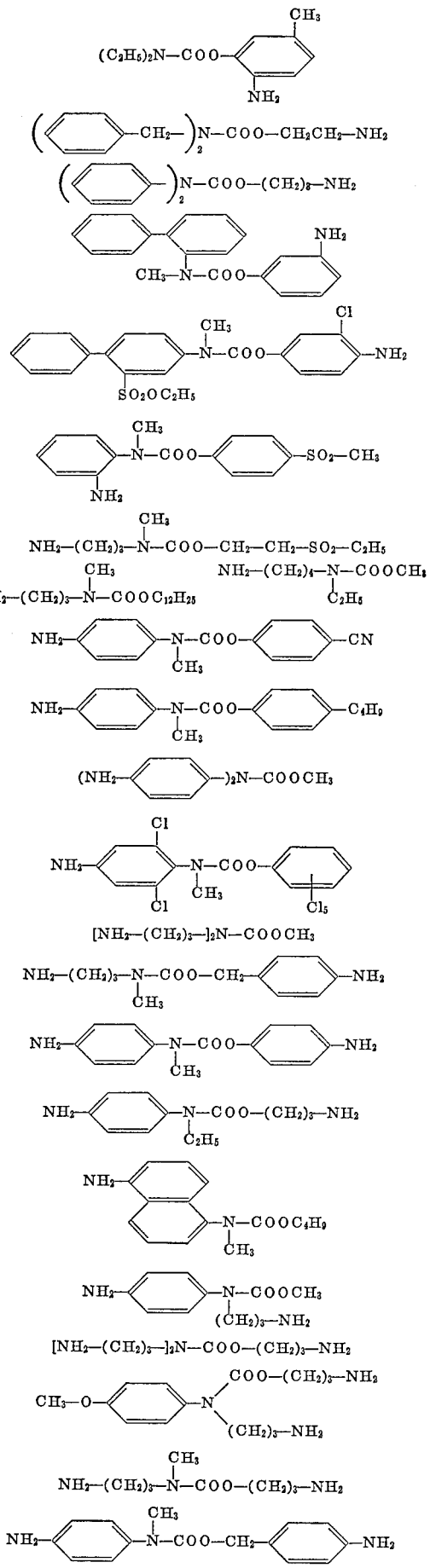

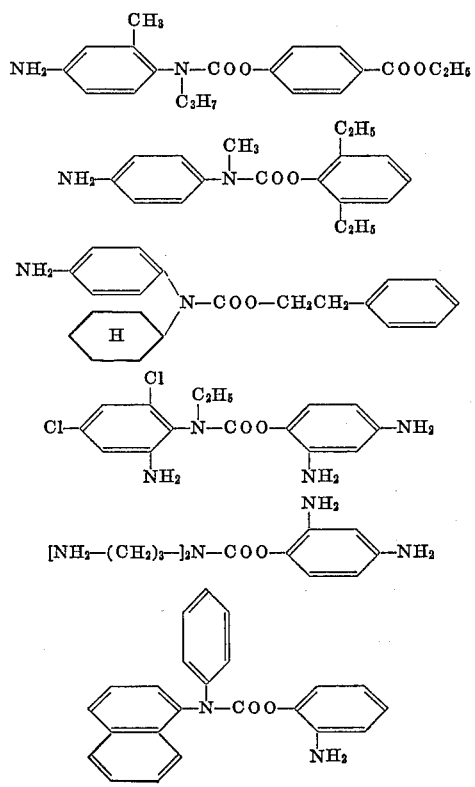
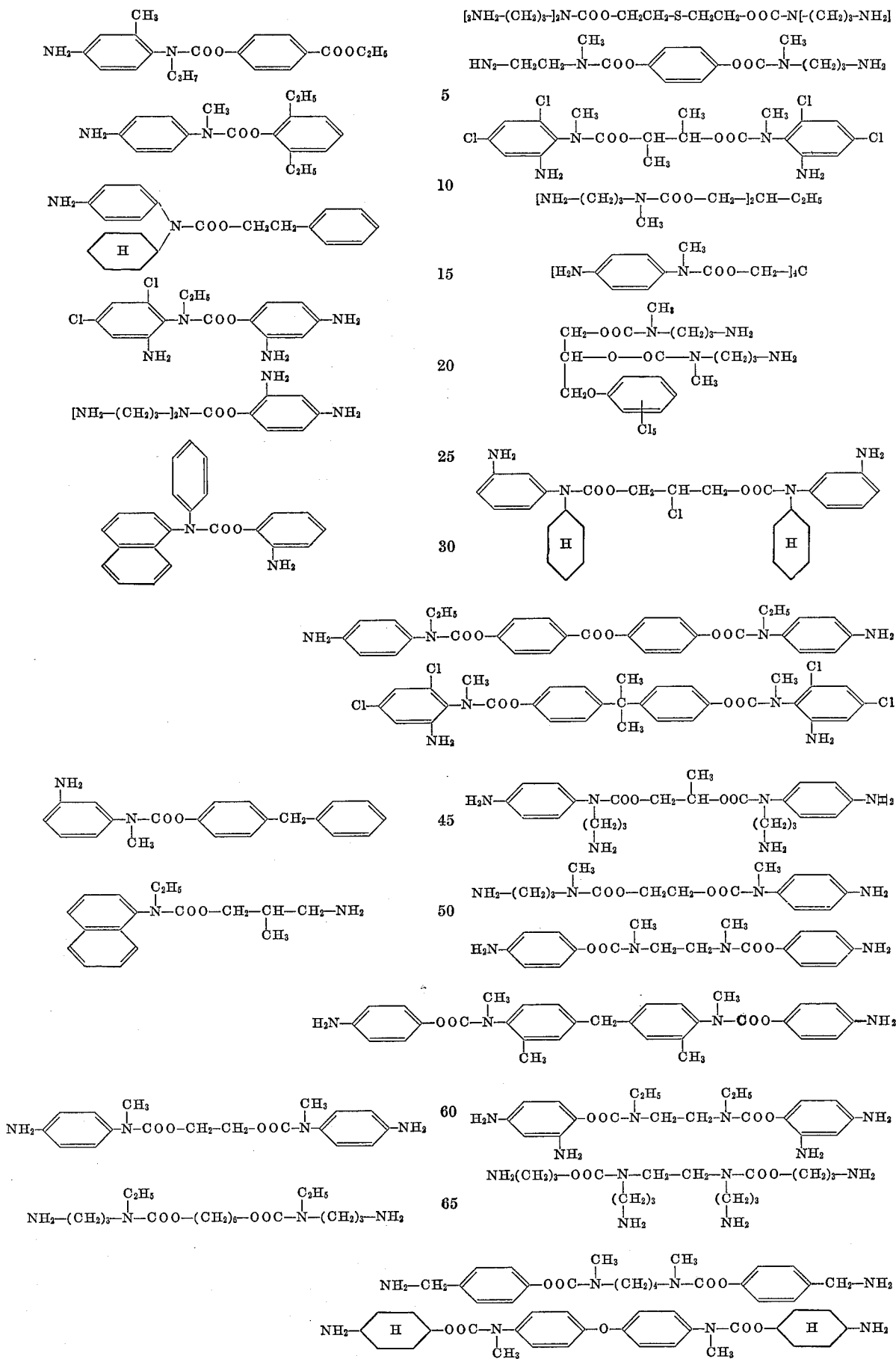

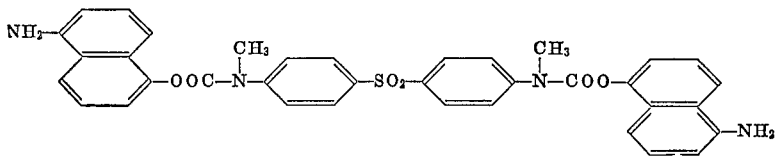

It is to be understood that the foregoing listing is merely illustrative as opposed to being limitative, and that it is impossible to list all of the compounds both aromatic and aliphatic which come within the contemplated scope of this invention. The isocyanate compounds produced according to the process of this invention will thus generally correspond to the formula

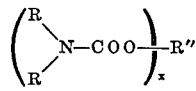

wherein X is 1 or 2 and is equal to the valence of the R" radical R, R' and R" are each a saturated aliphatic hydrocarbon radical, an aromatic hydrocarbon radical or a substituted hydrocarbon radical, preferably saturated aliphatic, aromatic or mixed aliphatic-aromatic radicals wherein the hydrocarbon radicals may be interrupted by members selected from the group consisting of —S—, —O—, —SO$_2$—, —SO$_3$—, and —COO— and wherein the substituents in the substituted hydrocarbon radicals are selected from the group consisting of —CN, —Cl, —Br, —NCO and mixtures thereof. At least one of the R, R' or R" radicals is an —NCO substituted radicals.

Conversion of the heretofore in general unknown primary mono and polyamines into the corresponding new mono and polyisocyanates can be carried out by the usual technical methods of phosgenation, such as, for example, by cold phase/hot phase phosgenation or by the hydrochloride or carbamate process in which the corresponding amine hydrochlorides or carbamates are reacted with phosgene. The phosgenation conditions employed can be varied within certain limits, and benzene, toluene, chlorobenzene, trichlorobenzene, or any other suitable hydrocarbon may be used as a solvent for the phosgenation. In particular cases, however, other solvents such as, for example, nitrobenzene or tetramethylene sulphone may also be used.

It is advisable not to employ too high a phosgenation temperature if a good yield is to be obtained, and for this reason, the cold phase/hot phase phosgenation is preferred. In a cold phase/hot phase phosgenation, the mixture of carbamyl chloride and amine hydrochloride is precipitated in such a fine suspension that the hot phosgenation is completed in a short time at temperatures as low as about 100°. Moreover, the phosgenation reaction may be carried out either continuously or discontinuously.

Depending on the type of amine used as the starting material, the new isocyanate formed is either a liquid which can be distilled, an oil or a crystalline substance. The unique isocyanates of this invention are intended to be used as intermediate products for the production of pesticides, pharmaceutical materials and dressings for textiles and leather.

The products of this invention, for instance the polyisocyanate obtained according to Example 14, are suitable as adhesives for bonding rubbers, rubber and metal and rubber and textiles. They may be used alone or combined with solutions of natural or synthetic rubber.

The invention is further illustrated but not limited by the following examples, in which parts and percentages are by weight unless otherwise specified.

EXAMPLE 1

Preparation of

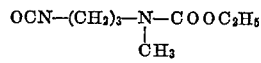

(a) Preparation of the amine.—About 200 parts of N-methyl-N-beta-cyanoethyl-ethyl-urethane (prepared from chloroformic acid ethyl ester and beta-(N-methylamino)- propionitrile) are dissolved in about 400 ml. of ethanol and after the addition of about 30 parts of Raney cobalt the reaction mixture is hydrogenated catalytically at a hydrogen pressure of about 200 atmospheres at about 80° C. in an autoclave having a 1.3 liter capacity. The calculated quantity of hydrogen is taken up in the course of about 40 minutes. After cooling to room temperature, the reaction product is separated from the catalyst by filtration and concentrated by evaporation in vacuo. About 204 parts of a pale yellow liquid remains behind which is distilled off in vacuo. About 190 parts (90% of theoretical) of N-methyl-N-3-aminopropyl-ethyl urethane remain behind in the form of a colorless liquid. B.P. at 0.09 mm. Hg=about 57° C.; $n_D^{20}$=about 1.4520.

(b) Preparation of the isocyanate.—About 81 parts of the amine prepared according to (a) are dissolved in about 750 ml. of chlorobenzene. About 20 parts of gaseous hydrogen chloride are passed into the solution to convert the free amine into the hydrochloride. Phosgene is then passed into the colorless solution at about 90° to 110° C. until a sample of the waste gas can no longer be detected to contain any hydrogen chloride; about 6 hours are required for this. Nitrogen is then blown through the solution for about 3 hours at about 80° to 90° C. to remove excess phosgene and the solution is finally concentrated by evaporation under reduced presesure. The residue (about 94 parts of a pale yellow oil) is distilled in vacuo. B.P. at 0.04 mm. Hg=about 87° to 88° C.; $n_D^{20}$=about 1.4509; NCO content=about 26.2% (calculated 26.2%); yield: about 85 g. (90% of theoretical) of a colorless liquid.

EXAMPLE 2

Preparation of

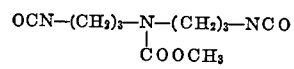

(a) About 181 parts of N-bis-(beta-cyanoethyl)-methyl-urethane, prepared from di-(beta-cyanoethyl)-amine and chloroformic acid methyl ester, are dissolved in about 400 ml. of methanol and hydrogenated catalytically under a hydrogen pressure of about 200 atmospheres at about 70° C. in the presence of Raney cobalt in an autoclave equipped with stirrer and having a capacity of about 1.3 liters. At the end of about 1.5 hours, the theoretical quantity of hydrogen has been taken up, the catalyst is removed by vacuum filtration and the colorless solution is concentrated by evaporation under reduced pressure. About 180 parts (95% of theoretical) of N-bis-(3-aminopropyl)-methyl urethane remain behind in the residue in the form of a pale yellow oil ($n_D^{20}$=about 1.4760).

(b) About 95 parts of the diamine prepared according to (a) are added dropwise at about −10° C. to a solution of about 200 parts of phosgene in about 700 ml. of chlorobenzene. The resulting suspension is stirred for several hours at about 0° C. and then heated gradually while phosgene is passed through it. Phosgenation is continued at about 100° to about 120° C. until a sample of the waste gas no longer contains hydrogen chloride and the suspension has been converted into a clear solution except for a small residue adhering to the wall of the flask. Nitrogen is passed through the solution for about 2 hours at about 90° C. and the solution is filtered and concentrated by evaporation under reduced pressure. About 97 parts of N-bis-(3-isocyanato-propyl) methyl urethane remain behind in the residue in the form of a clear yellow oil which can be distilled without decomposition in a good vacuum. B.P. at 9.12 mm. Hg=about 158° to 162° C.; NCO content=about 35.0% (calculated 34.9%).

EXAMPLE 3

Preparation of

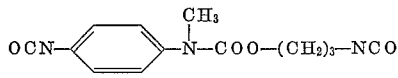

(a) About 69 parts of N-methyl-N-p-nitrophenyl-O-beta-cyanoethylurethane, prepared from 4-nitrophenyl-methyl-carbamic acid chloride and ethylene cyanohydrin, are hydrogenated in about 230 ml. of methanol in the presence of Raney cobalt at about 80° C. and about 200 atmospheres of hydrogen. After removal of the catalyst, a clear brown solution is obtained from which about 57 parts of N-methyl-N-4-aminophenyl-0-3-aminopropyl-urethane are isolated in the form of a brown oil on concentration by evaporation.

(b) About 50 parts of the diamine obtained according to (a) are dissolved in about 50 ml. of tetramethylene-sulphone. This solution is added dropwise to a solution of about 100 parts of phosgene in about 350 ml. of chlorobenzene cooled to about −10° C. The suspension formed is left to stand overnight at about 0° C. and on the following day phosgene is introduced from a cylinder with gradual increase of the temperature. After phosgenation for about five hours at about 100° to 110° C. the evolution of hydrogen chloride is complete. To remove excess phosgene, nitrogen is blown through the solution for about 3 hours and undissolved byproducts are then separated by filtration. A brown solution is obtained which is then conducted over a thin layer evaporator at a temperature of about 150° C. and a vacuum of about 1 mm. Hg to remove the solvent. About 40 parts of N-methyl - N - 4 - isocyanate-phenyl-0–3-isocyanato-propyl urethane is obtained as a distillation residue in the form of a brown oil which has an NCO content of about 29.2% (calculated, 30.6%). In the subsequent distillation under a high vacuum, the pure isocyanate is obtained in the form of a colorless oil having an NCO content of about 30.2%. B.P. at 0.08 mm. Hg=about 166° C.; $n_D^{20}$=about 1.5468.

EXAMPLE 4

Preparation of

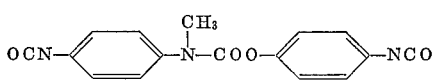

(a) About 47 parts of N-methyl-N:O-bis(4-nitrophenyl)urethane, prepared from 4-nitro-N-methylaniline and chloroformic acid-4-nitrophenyl ester, are dissolved in about 250 ml. of methanol and hydrogenated catalytically in the presence of Raney nickel at a hydrogen pressure of about 60 atmospheres and a temperature of about 45° C. in an autoclave equipped with stirrer and having about a 0.7 liter capacity. Hydrogenation is terminated after about 45 minutes. The catalyst is filtered off and the clear colorless solution is concentrated by evaporation under reduced pressure. About 32 parts of N-methyl-N:O-bis(4-aminophenyl)-urethane remain behind in the residue in the form of colorless crystals having a melting point of about 135° C.

(b) About 30 parts of the diamine prepared according to (a) are added at about −5° C. to a solution of about 100 parts of phosgene in about 350 ml. of chlorobenzene. The suspension formed is stirred for about 3 hours at about 0° C. and then gradually heated to about 100° C. while phosgene is passed through it. A yellow solution is obtained after phosgenation for about five hours at about 100° C. Nitrogen is blown through this solution for about 3 hours and the solution is stirred for about 30 minutes with the addition of activated charcoal; the solution is then filtered and concentrated by evaporation in vacuo. The crystalline residue obtained is triturated, washed with a little petrol and dried at about 50° C. About 25 parts of N-methyl-N:O-bis(4-isocyanatophenyl)-urethane are obtained in the form of colorless crystals having a melting point of about 85° C.

EXAMPLE 5

(a) Preparation of the starting material.—142 g. of N-methyl-N-β-cyanoethyl-methylurethane (prepared from chloroformic acid methyl ester and β-(N-methylamino)-propionitrile) are hydrogenated catalytically in 200 ml. of methanol in the presence of 20 g. of Raney cobalt in an autoclave at a hydrogen pressure of 200 atmospheres at 70° C. for two hours. The reaction product is separated from the catalyst by filtering and evaporated in vacuum. The residue, 135 g. of a colorless liquid, is distilled in vacuum. B.P. at 13 mm. Hg=112–114° C., $n_D^{20}$=1.4575. Yield: 123 g. (85% of the theoretical) of colorless liquid.

(b) Process according to the invention.—25 g. of gaseous hydrogen chloride are passed into a solution of 50 g. of the amine prepared according to Example 5(a) in 500 ml. of toluene at 50° C. A vigorous stream of phosgene is then passed with good stirring through the solution at 100° C. until hydrogen chloride can no longer be detected in a sample of the waste gas. To remove excess phosgene the resulting clear, pale yellow solution is blown out with nitrogen at 90° C. for 3 hours and then evaporated. 72 g. of a yellow clear oil of the formula

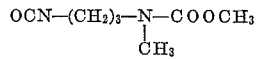

remain in the solution. Colorless liquid of the B.P. at 0.08 mm. Hg=85–86° C.; $n_D^{20}$=1.4548; NCO content: found 26.8%.

EXAMPLE 6

(a) Preparation of the starting material.—195 g. of N-bis-(β-cyanoethyl)-ethylurethane (prepared from di-(β-cyanoethyl)-amine and chloroformic acid ethyl ester) are hydrogenated in 400 ml. of methane analogously to Example 2(a) and then worked up. 190 g. of N-bis-(3-aminopropyl)-ethylurethane are obtained as reaction product in form of a yellow oil. The crude product can be distilled in good vacuum. B.P. at 0.04 mm. Hg=95–99° C.; $n_D^{20}$=1.4748.

(b) Process according to the invention.—110 g. of the diamine prepared according to Example 6(a) are phosgenated by the method described in Example 2(b). 130 g. ow N-bis(3-isocyanatopropyl)-ethylurethane of the formula

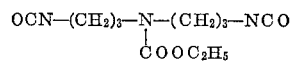

are obtained as reaction product in form of a pale brown oil which can be distilled without decomposition by means of a thin film evaporator. B.P. at 0.3 mm. Hg= 145–148° C.

EXAMPLE 7

(a) Preparation of the starting material.—60 g. of N-methyl-N-(4-nitrophenyl) - methylurethane (prepared from 4-nitro-N-methylaniline and chloroformic acid ethyl ester) are suspended in 100 ml. of methanol and hydrogenated in the presence of 20 g. Raney nickel at a hydrogen pressure of 60 atmospheres at 45° C. for two hours. The clear solution obtained after filtering off the Raney nickel is evaporated under reduced pressure. 48 g. of N-methyl-N-4-aminophenyl-methylurethane remain in the residue to form of pale brown crystals of a crude melting point of 84–85° C. Upon recrystallisation from benzene colorless crystals of the melting point 89° C. are obtained.

(b) Process according to the invention.—47 g. of the amine prepared according to Example 7b are introduced in finely powdered form into a solution of 50 g. of phosgene in 300 ml. of chlorobenzene at −5° C. The resulting suspension is left standing overnight at 0° C. and then gradually heated to 100° C. while introducing phosgene. After phosgenation at 100° C. for three hours there is obtained a clear yellow solution. The solution is blown out with nitrogen for three hours and evaporated under reduced pressure. 57 g. of N-methyl-N-(4-isocyanatophenyl)-methylurethane of the formula

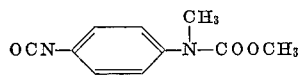

remain in form of a yellow liquid.

The pure compound is obtained by distillation in vacuum as a colorless liquid of the M.P. at 0.05 mm. Hg= 110° C.; $n_D^{20}=1.5520$.

EXAMPLE 8

(a) Preparation of the starting material.—88 g. of ethyleneglycol - bis - ( - methyl - N - 4 - nitrophenyl) - urethane (prepared from ethyleneglycol and 4-nitrophenyl-methyl-carbamic acid chloride) are hydrogenated catalytically with Raney nickel in 300 ml. of methanol analogously to the method described in Example 7a After separating off the catalyst the hydrogen solution is evaporated to a fifth of its original volume and cooled down to 0° C. The reaction product crystallises in form of colorless crystals of the melting point 159° C. Yield: 58 g. (88% of the theoretical).

(b) Process according to the invention.—55 g. of the diamine prepared according to Example 8a are introduced at 0° C. into a solution of 80 g. of phosgene in 500 ml. of chlorobenzene. Upon working up analogously to Example 7a, 60 g. of ethyleneglycol-bis-(N-methyl-N-4-isocyanotophenyl)-urethane of the formula

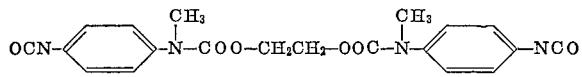

are obtained as reaction product in form of colorless crystals of the melting point 97° C. (NCO content: calculated: 20.4%, found: 19.9%.)

EXAMPLE 9

(a) Preparation of the starting material.—75 g. of N,N - dimethyl - 2 - cyanoethylurethane (prepared from chloroformic acid-2-cyanoethyl ester and dimethylamine) are hydrogenated catalytically in 300 ml. of methanol in the presence of 20 g. of Raney cobalt under a hydrogen pressure of 200 atmospheres at 80° C. After the theoretical amount of hydrogen has been taken up the contact material is filtered off and the yellow filtrate obtained evaporated under reduced pressure. 59 g. of N,N-dimethyl-3-aminopropylurethane remain in the residue in form of a reddish oil. Upon distillation 43 g. of the pure compound of the B.P. at 91° C. under 0.8 mm. Hg are obtained in form of a colorless liquid; $n_D^{20}=1.4557$.

(a) Process according to the invention.—40 g. of the amine prepared according to Example 9a are reacted in toluene with hydrogen chloride and subsequently with phosgene according to the method described in Example 5b. 45 g. of N,N-dimethyl-3-isocyanatopropylurethane of the formula

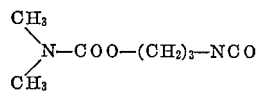

are obtained as reaction product in form of a colorless liquid. B.P. at 0.1 mm. Hg=81° C.; $n_D^{20}=1.4515$; NCO content: Calculated 24.5%. Found: 24.45%.

EXAMPLE 10

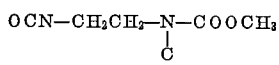

(a) Preparation of the starting material.—110 g. of N-methyl-N-cyanomethyl-carbamic acid methyl ester (prepared from N-methylamino-acetonitrile and chloroformic acid methyl ester) are hydrogenated catalytically together with 400 ml. of methanol and 30 g. of Raney cobalt in an 0.7 l. stirrer autoclave at 80° C. and a hydrogen pressure of 200 atmospheres. The theortical amount of hydrogen is taken up within about 2 hours. The reaction product is separated off from the catalyst by filtration and the clear reaction solution evaporated in vacuum.

112 g. of N-methyl-N-2-aminoethyl-carbamic acid methyl ester remain in the residue in form of a colorless liquid which is distilled in vacuum. B.P. at 11 mm. Hg= 96–98° C.; $n_D^{20}=1.4570$. Yield: 85 g. (75% of the theoretical) of a colorless liquid.

(b) Process according to the invention.—39.6 g. of the amine prepared according to Example 10a are dissolved in 250 ml. of chloro benzene. 15 g. of hydrogen chloride are introduced into the solution at 60° C. and a vigorous stream of phosgene is then passed in at 100–110° C. After phosgenation at 110° C. for 3 hours there is obtained a clear solution which is blown out with nitrogen at 90° C. for 3 hours to remove excess phosgene and dissolved hydrogen chloride and then evaporated under reduced pressure. 42 g. of N-methyl-N-2-isocyanatoethyl-carbamic acid methyl ester remain in the residue in form of a colorless oil. The product can be distilled in vacuum. B.P. at 0.15 mm. Hg=84–86° C.; $n_D^{20}=1.4528$; NCO content; found 26.7%; calculated 26.6%.

EXAMPLE 11

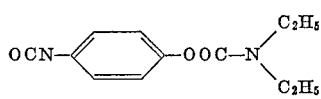

(a) Preparation of the starting material.—95 g. of N,N-diethyl-carbamic acid-4-nitrophenyl ester (prepared from chloroformic acid-4-nitrophenyl ester and diethylamine) are hydrogenated catalytically in 350 ml. of methanol in the presence of 20 g. of Raney nickel at 60° C. and a hydrogen pressure of 60 atmospheres. After the theoretical amount of hydrogen has been taken up the contact material is filtered off and the resulting dark brown solution evaporated under reduced pressure. 70 g. of crude N,N-diethyl-carbamic acid-4-aminophenyl ester remain in the residue in form of a dark brown oil which crystallises after briefly standing. The initially smeary crystal mass is purified by pressing out on clay. Yield: 57 g. of light brown crystals, M.P. 53° C.

(b) Process according to the invention.—52 g. of the amine prepared according to Example 11a are introduced at 0° C. into a solution of 100 g. of phosgene in 350 ml. of chloro benzene. The resulting suspension is kept overnight at a temperature of +5° C. and then gradually heated up to 100° C. while introducing further phosgene. After phosgenation at 100° C. for 5 hours there is obtained a clear yellow solution which is blown out with nitrogen at 90° C. for 3 hours and then evaporated under reduced pressure. The residue is distilled in vacuum. B.P. at 0.1 mm. Hg=120° C., $n_D^{20}=1.5243$, NCO content: calculated: 18.0%; found: 18.1%. Yield: 53 g. of a colorless liquid.

EXAMPLE 12

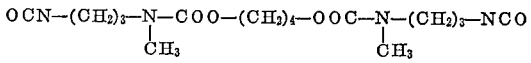

(a) Preparation of the starting material.—230 g. of tetramethylene - bis - (N-methyl-N-β-cyanoethylcarbamic acid ester) (prepared from β-N-methylamino-propionitrile and butanediol-bis-chloroformic acid ester) are dissolved in 800 ml. of methanol and hydrogen chloride in the persence of 50 g. of Raney cobalt at 80° C. and a hydrogen pressure of 200 atmospheres. After the theoretical amount of hydrogen has been taken up (about 3 hours) the contact material is filtered off and the reaction solution evaporated under reduced pressure. 215 g. of tetramethylene-bis-(N-methyl-N-3-aminopropyl-carbamic acid ester remain in the residue in form of a light yellow oil which cannot be distilled without decomposition ($n_D^{20}$=1.4805)

(b) Process according to the invention.—53 g. of the amine prepared according to Example 12a are dissolved in 400 ml. of chloro benzene. Carbon dioxide is introduced into the solution at 90° C. until saturation. A viscous colorless suspension of the carbamate is obtained. The suspension is stirred at room temperature for 6 hours. 100 g. of phosgene are then passed in at —5° C. for 2 hours and the suspension is then gradually heated up to 100° C. while introducing further phosgene. The viscosity of the reaction mixture continuously decreases and a clear colorless solution is obtained after phosgenation at 100—110° C. for about 4 hours. This solution is blown out with nitrogen at 90° C. for 3 hours and finally evaporated under reduced pressure. 63 g. of the diisocyanate of the above formula remain in the residue in form of a light yellow oil. NCO content: calculated: 22.7%, found: 21.2%.

EXAMPLE 13

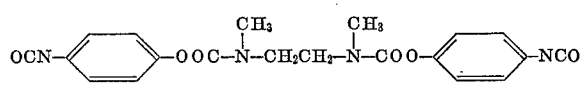

(a) Preparation of the starting material.—156 g. of the compound according to the formula

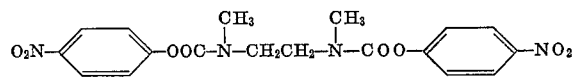

(prepared from N,N' - dimethylethylenediamine and chloroformic acid-4-nitrophenylester) are hydrogenated catalytically in 500 ml. of methanol in the presence of 30 g. of Raney cobalt at 50° C. and a hydrogen pressure of 60 atmospheres. After the calculated amount of hydrogen has been taken up (1.5 hours) the catalyst is filtered off and the filtrate evaporated under reduced pressure. 100 g. of the diamine of the formula

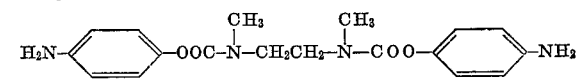

remain in the residue as a yellow oil which crystallises upon cooling. By recrystallisation from methane 85 g. of a pure compound are obtained in form of brownish crystals of the melting point 164° C.

(b) Process according to the invention.—85 g. of the diamine prepared according to Example 13a are introduced in finely powdered form at —5° C. into a solution of 100 g. of phosgene in 600 ml. of chloro benzene. The resulting suspension is left standing overnight at 0° C. and phosgene is then introduced from a cylinder while gradually increasing the temperature up to 90° C. After phosgenation at 90–95° C. for 6 hours there is obtained a clear pale yellow solution which is blown out with nitrogen at 70° C. for 3 hours and then evaporated under reduced pressure 70 g. of the diisocyanate remain in the residue in form of colorless crystals which melt at 120–122° C. after recrystallisation from benzene. NCO content: calculated: 20.5%, found: 20.8%.

EXAMPLE 14

Preparation of

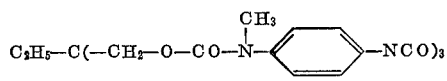

(a) Preparation of the starting material.—200 g. of a compound of the formula

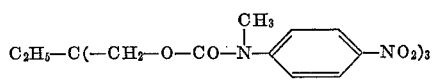

(prepared from trimethylolpropane and 4-nitrophenyl methyl-carbamic acid chloride) are hydrogenated catalytically in 600 ml. of methanol in the presence of 30 g. of Raney nickel at 60° C. and a hydrogen pressure of 60 atmospheres. The catalyst is filtered off from the hydrogenation solution and the solution is evaporated in vacuum. 140 g. of the triamine of the formula

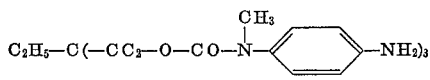

remain in the residue in form of a brown oil.

(b) Process according to the invention.—The oil according to Example 14a is added dropwise at 0 to 5° C. into a solution of 200 g. of phosgene in 800 ml. of chlorobenzene. The resultant suspension is stirred overnight at room temperature and then heated to 90 to 100° C. while introducing phosgene until the waste gas no longer contains hydrogen chloride. The solution is then blown out with nitrogen and clarified with activated carbon. The clarified solution is evaporated in vacuum. The residue is dissolved in little hot benzene and treated with ligroine until turbidity occurs. After clarifying once more with activated carbon, the filtrate is evaporated under reduced pressure. 80 g. of the triisocyanate of the above formula remain in the residue in form of a brown viscous oil having a NCO-content of 20.7% (calculated 19.3%).

It is to be understood that the foregoing examples are solely for the purpose of illustration and are not intended to limit the concept disclosed herein. Therefore, any suitable constituent as disclosed herein may be substituted for that used in the foregoing examples, and those skilled in the art may make modifications therein without departing from the spirit and scope of the invention except as set forth in the claims.

What is claimed is:

1. An isocyanate compound containing at least one N-disubstituted urethane group and having the formula

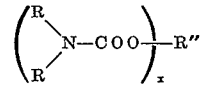

wherein X is 1 or 2; R, R' and R" is each a member selected from the group consisting of saturated aliphatic hydrocarbon radicals, aromatic hydrocarbon radicals and substituted hydrocarbon radicals, wherein said hydrocarbon radicals may be interrupted by members selected from the group consisting of —S—, —O—, —SO$_2$—, —SO$_3$—, and —COO—; and wherein said substituents on said substituted hydrocarbon radicals are selected from the group consisting of —CN, —Cl, —Br, —NCO and mixtures thereof, with the proviso that at least one of the R, and R' and R" radicals be an —NCO substituted radical.

2. The compound of claim 1 in which the isocyanate is an aromatic isocyanate containing at least one N-disubstituted urethane group.

3. The compound of claim 1 in which the isocyanate is an aliphatic isocyanate containing at least one N-disubstituted urethane group.

4. The compound of claim 1 in which the isocyanate is a mixed aliphatic-aromatic isocyanate.

5. The compound of claim 1 in which the isocyanate is a monoisocyanate.

6. The compound of claim 1 in which the isocyanate is a polyisocyanate.

7. An isocyanate of the formula

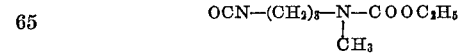

8. An isocyanate of the formula

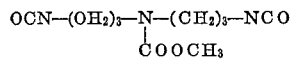

9. An isocyanate of the formula

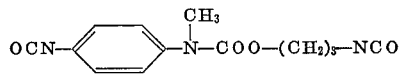

10. An isocyanate of the formula

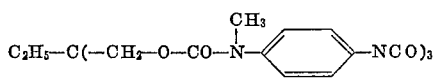

11. A process for preparing an isocyanate compound comprising reacting phosgene with a primary amine containing at least one N-disubstituted urethane group, wherein the substituents on the N-atom are selected from the group consisting of a hydrocarbon radical or a substituted hydrocarbon radical, and wherein the substituents on the hydrocarbon radical are selected from the group consisting of isocyanato-, ether-, nitrile-, sulfonyl-, sulfonic acid ester-, carboxylic acid ester-, chlorine and bromine and mixtures thereof.

References Cited
UNITED STATES PATENTS 3,183,112   5/1965   Gemassmer.

LORRAINE A. WEINBERGER, Primary Examiner

L. A. THAXTON, Assistant Examiner

U.S. Cl. X.R.

260—482, 456, 470